Jan. 27, 1970  B. N. UTZ  3,491,869
VENDING MACHINE FOR ALCOHOLIC BEVERAGES
Filed Nov. 6, 1968  2 Sheets-Sheet 1
FIG. 1
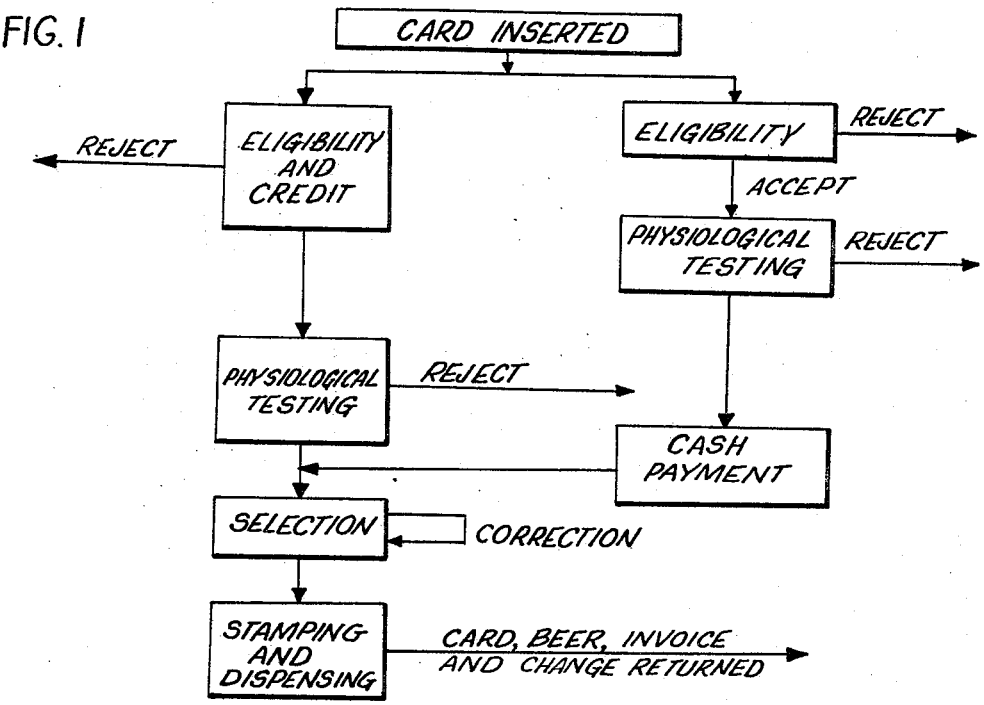
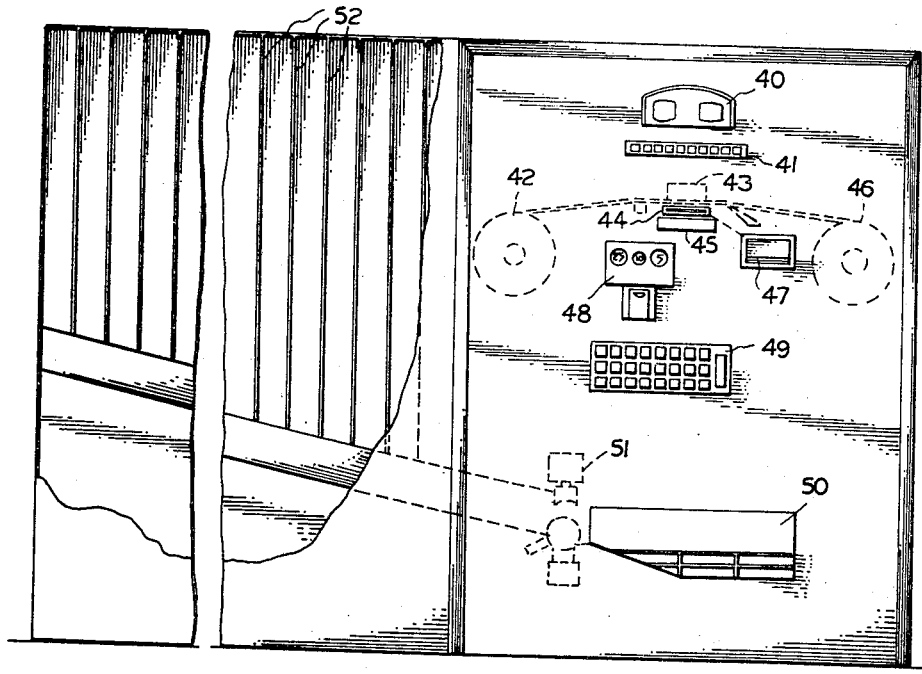
FIG. 4
INVENTOR.
BILLY N. UTZ
BY
McLean, Morton + Boustead
ATTORNEYS Jan. 27, 1970      B. N. UTZ      3,491,869
VENDING MACHINE FOR ALCOHOLIC BEVERAGES
Filed Nov. 6, 1968      2 Sheets-Sheet 2
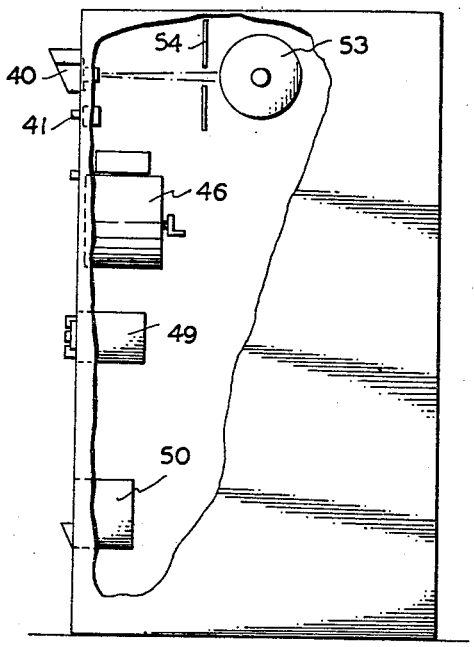
FIG. 5
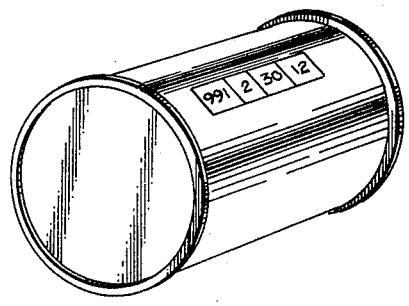
FIG. 6
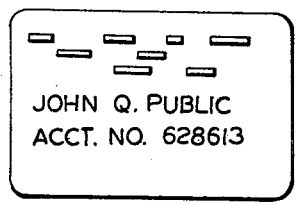
FIG. 2
FIG. 3
INVENTOR.
BILLY N. UTZ
BY McLean Morton + Boustead
ATTORNEYS United States Patent Office 3,491,869
Patented Jan. 27, 1970

3,491,869
VENDING MACHINE FOR ALCOHOLIC BEVERAGES
Billy N. Utz, 312 E. Williamsburg Road, Sterling, Va. 22170
Continuation-in-part of application Ser. No. 685,231, Nov. 6, 1967. This application Nov. 6, 1968, Ser. No. 780,307
Int. Cl. G07f 7/02, 11/00
U.S. Cl. 194—2                       3 Claims

ABSTRACT OF THE DISCLOSURE

This invention relates to a vending machine for alcoholic beverages. More particularly it relates to a machine for selling beverages which combines with the usual vending mechanism an interlocking buyer identification, physiological tester and credit recorder.

---

This application is a continuation-in-part and in part discloses the subject matter of and claims the priority of Ser. No. 365,737, filed May 7, 1964, now abandoned; Ser. No. 500,993, filed Oct. 22, 1965, now abandoned; and Ser. No. 685,231, filed Nov. 6, 1967, now abandoned.

There are several legal and business problems incident to selling alcoholic beverages which this machine overcomes. All jurisdictions prohibit sale of alcoholic beverages to those under a certain age and in certain jurisdictions those interdicted, i.e., those on parole or recently released from State hospitals. All jurisdictions prohibit sale to intoxicated persons.

The sale of beverages in stores meets these requirements only imperfectly. Intoxication can be well masked by many individuals and bogus identifications are frequently employed. The clerk has only limited time to devote to the matter and in a privately operated store is under some compulsion to resolve the matter in the buyer's favor. This machine combines a sobriety tester more accurate than any personal observation and a personal identification card which insures the holder is eligible to purchase.

A further feature of the invention is that a record of the purchase and purchaser is recorded both in the machine and on each bottle or can dispensed. This should substantially eliminate the practice of lending identification cards to minors or buying beverages for resale to minors. Using this invention, beverages in the possession of minors will always be traceable to the purchaser.

Also, this feature will for the first time make enforceable the practically universal anti-litter laws. Every empty can beside the highway will bear the mark of its purchaser. It will also be of use to the police while investigating crimes.

The vending machine will also offer substantial benefits to the retail merchant. It will substantially reduce the labor cost in selling small quantities of beer. It will extend the hours of operation since it need not be attended. Where permissible it will sell on credit, thus reducing the amount of cash present and the consequent danger of theft.

The machine may, of course, be used to sell any type of alcoholic or non-alcoholic beverages. In addition the eligibility and sobriety tester may be used independently in a conventional liquor store. The machine will be described in the remainder of the specification, however, as adapted to dispense solely cans of beer or ale.

In general, the present invention comprises a refrigerated vending machine having a slot for receiving a plastic identity card. The card will have been issued to its holder either by the controlling agency or by the vending machine company, directly after assurance to the agency or company that the applicant is entitled to purchase the beverages. The machine is provided with a roll of invoices to record the time, quantity and purchaser of each transaction. As an essential feature of my invention a physiological tester is included to assure the sobriety of each purchaser. Means are also provided for stamping each beer can with the machine and transaction number. All of the aforedescribed components are interlocked and work in a given sequence such that any non-compliance will void the whole operation; more specifically, for my preferred embodiment, one must have the identification card to activate the physiological tester; the physiological test standard must be surpassed to activate the product and quantity selector; and the selector and credit/cash verifier must be completed to vend the contents.

For a more detailed understanding of the invention, reference is made to the description of a preferred embodiment thereof that follows and the accompanying drawings, in which:

FIG. 1 is a schematic block diagram explaining the operation of the apparatus in a typical and preferred embodiment; however, the specific stages depicted may be used in alternative sequences;

FIG. 2 is a representation of a raised letter plastic identification and credit card;

FIG. 3 is a typical invoice card as used by my machine;

FIG. 4 is a front cutaway view of a typical embodiment of the invention;

FIG. 5 is a cutaway elevation of the physiological tester; and

FIG. 6 is a perspective view of a beer can as dispensed for the machine.

Referring to FIGURE 1, the card is first inserted in the machine. If the machine accepts credit sales, both the legal eligibility and the credit eligibility are determined. If the machine does not accept credit or if the card is a cash only card, the legal eligibility alone is determined. The determination of the legal eligibility, and credit eligibility if desired, can be accomplished through the use of any known sensing means, such as, for example, the validity sensing and recording means shown in U.S. Patent 3,039,582. An apparatus of this type generally comprises a rotatably mounted receptacle which has mounted on its circumference code means which are similar in appearance and position to code means provided on the card in the form of holes. Illumination means are provided below the card. Activation of the device is performed by non-coincidence of the card code and receptacle code. When there is coincidence, a two-section photoelectric means disposed above the identification means receives a signal to prevent further operation of the apparatus thus signifying that the subscriber is not acceptable. If there is no coincidence, the card is advanced to a new position where an image recording means is activated to provide a record of the transaction. The exchange article may then be selected and the identification card is returned. The above mentioned apparatus handles both credit and cash sales and records the sale after the validity of the identification card is established. Similarly, U.S. Patent No. 3,020,994 discloses another suitable apparatus for receiving identification from a card, receiving a coin input and recording the input within the machine while dispensing a permanent record of the transaction to the person conducting the transaction. As is disclosed therein, an identification card is inserted in a holder and the holder is pushed into the machine through an aperture. The closing of the door of the aperture closes a switch which energizes printing wheels. The insertion of coins into the machine indexes the printing wheels to correspond with the amount deposited. After the proper coins have been deposited, the operator presses a button on the outside of the machine. This causes the printing wheels to print the transaction on ink impregnated tape making duplicate receipts. One of the receipts is discharged to the depositor with his identification card. The printing wheels also transfer the information (name, serial number, etc.) from the identification card to the duplicate receipts. Other systems are well-known in the art. Assuming the purchaser has been accepted, the physiological tester is activated. An alternative sequence could require proper payment at this stage to activate the physiological tester.

The physiological tester allows the purchaser to demonstrate his sobriety. If he fails, his card is returned. If he passes, however, the selection portion is activated, and the purchaser inserts cash, where credit purchases are unauthorized and chooses the brand and quantity he desires. A correction unit may be incorporated for a purchaser who changes his mind. The change-making and dispensing means also included in the machine as a necessary adjunct to cash sales can be any of several well-known mechanisms for receiving coins and discharging change, as for example, the mechanims disclosed in U.S. Patents No. 3,082,852 and 3,080,035.

The cans of beer are then delivered after having the machine and transaction number stamped on them. Simultaneously the identity card and change, if any, and an invoice, are returned to the purchaser.

All of the stages quoted are necessary but the sequence utilized may vary with different vending machines, i.e., insert money, insert card, surpass physiological test; or surpass physiological test, insert card, insert money, etc. Although the steps to be taken are essential, the specific order adapted for a machine is not a critical point. Also, as is well-known in the art, each step in the specific order chosen may be used as the activation means for the next step, i.e., each step must be completed successfully before the next step is activated and each step contains the means to activate the next step. For example, when the identity and/or credit card establishes the validity of the transaction, an electrical relay can be energized which will activate either the physiological tester or the coin receiving mechanism depending upon which series of operations the machine is to use. In the same manner, the proper correlation of the physiological tester, as explained below, or the insertion of the proper amount of coinage can activate another relay switch which activates the next step. The activation can also be performed through the use of mechanical linkages. By way of example of suitable known apparatus, aforementioned U.S. Patent 3,039,582 shows the use of a series of relays and cams which are activated in a series of progressive steps starting with the insertion of an identity card and ending with the vending of an article. The aforesaid U.S. Patent 3,082,852 shows another apparatus, mechanically activated, where coin insertion withdraws a stop allowing the purchaser to pull a lever thus freeing the vending means.

FIGURE 2 shows an identity and credit card. As mentioned earlier, the card may be issued directly by the state or local authorities, or it may be issued by the vending company holding the local franchise. Adequate assurance of identity and eligibility, not possible in a store, could thus be secured. A card is then made up. This may be a plastic card of the type used by banks, department stores and oil companies or of any equivalent type. It can, for example, be a card containing electrically conductive portions in a pre-determined fashion as shown in U.S. Patent No. 3,136,402. The card will tell the sensing portion of the machine the identity of the purchaser, whether the sale is by cash or credit and in those jurisdictions allowing the sale of weaker beverages to younger people, the card may also note this partial eligibility.

The problem of unauthorized use may be further alleviated by periodically mailing new cards to all holders with a new basic code while resetting the machine accordingly.

An invoice is indicated in FIGURE 3. The invoice will purchaser's name, address and account number to be retained as well as delivering a copy to the purchaser, if record the sale, tax and total amounts. It will print the desired.

FIGURE 4 is a view of the complete machine. A viewer 40 and push buttons 41 form the visible portion of the physiological tester. The invoices are stored on drum 42. During the sale, they are positioned between a reader or sensor 43 and the card insert slot 44. After the invoice is printed by printer 45, one copy is wound on roll 46 while another copy is returned to the customer in opening 47. Coin box 48 is shown. The selection unit 49 comprises several rows of buttons and the receiving bin 50 is similar to conventional vending machines. To the left of the receiving bin is marking mechanism 51 which prints or embosses the machine and transaction number on each can as it passes. See FIG. 6. Also shown is the conventional can storage and refrigeration section 52.

FIGURE 5 shows the physiological tester. It is based on the known medical fact that loss of visual acuity is one of the earliest and most reliable indicators of inebriation. As a test of inebriation this method offers an additional benefit over machines which measure the alcoholic content of blood or breath.

It is well known that individuals vary widely in their tolerance to alcohol. This tester measures the effects of alcohol rather than the amount of alcohol. It, therefore, gives a more accurate indication of the individuals condition.

Any combination of several visual tests well known in the optical business would work well for my purposes. Illustrated is a roll 53 and blocking screen 54 which spins randomly after each purchase to present a new field to the next customer. The roll also spins randomly after each operation by a customer who fails to pass either the eligibility or physiological test to ensure a new setting is presented for each new customer operation. A stereoptic system such as used in the "Keystone Viewer" made by the Keystone View Company may be used. There a similar series of objects or numbers are viewed by each eye. One or more of the objects are slightly displaced making it appear slightly off focus when viewed. Another useful test would be measuring depth perception directly by any of several well known machines. One such tester, the Berhoff tester, uses a series of upright sticks and the viewer is supposed to select the most distant one. The proper correlation of any of the above-mentioned visual acuity tests is used to activate the next step in the operation. As explained above, this can be done through the use of conventional electrical relays or mechanical linkages well known in the art.

I claim:
1. In a vending machine for dispensing alcoholic beverages in containers the improvement comprising,
    (a) a means for receiving and reading an eligibility and identity card having means for activating a physiological tester wherein when the indicia on the card correspond to pre-set values the hereinafter described physiological tester is activated;
    (b) a physiological testing device for measuring visual acuity having means to activate the coin receiving mechanism wherein the tester is randomly set before each hereinafter operation of the manual controls, each random setting interconnected with manual controls outside the machine, each random setting corresponding to a particular setting to be made by the customer on the manual controls corresponding to the predetermined visual acuity whereby when the tester is activated and the manual controls are so set said physiological testing device activates the hereinafter described coin receiving mechanism;

(c) a coin receiving mechanism for payment for the alcoholic beverage having means to activate the vending mechanism wherein when it is activated and the proper payment is received, the beverage may be vended.

2. In a vending machine for dispensing alcoholic beverages in containers the improvement comprising, (a) means for receiving and reading an eligibility and identity card having means to activate the coin receiving mechanism wherein when the indicia on the card correspond to pre-set values the hereinafter described coin receiving mechanism is activated;

(b) a coin receiving mechanism for payment for the alcoholic beverage having means to activate a physiological tester wherein when it is activated and the proper payment is received, the hereinafter described physiological tester is activated;

(c) a physiological testing device for measuring visual acuity having means to activate a vending mechanism wherein the tester is randomly set before each hereinafter operation of the manual controls, each random setting interconnected with manual controls outside the machine, each random setting corresponding to a particular setting to be made by the customer on the manual controls corresponding to predetermined visual acuity whereby when the tester is activated and the manual controls are so set the containers of beverage may be vended.

3. In a vending machine for dispensing alcoholic beverages in containers the improvement comprising, (a) means for receiving and reading an eligibility identity and credit card having means to activate a physiological tester wherein when the eligibility indicia on the card correspond to pre-set values and when the identity portion indicates credit eligibility the physiological tester hereinafter described is activated.

(b) a physological testing device for measuring visual acuity having means to activate a vending mechanism wherein the tester is randomly set before each hereinafter operation of the manual controls, each random setting interconnected with manual controls outside the machine, each random setting corresponding to a particular setting to be made by the customer on the manual controls corresponding to predetermined visual acuity whereby when the tester is so activated and the manual controls are so set the containers of beverage may be vended.

References Cited
FOREIGN PATENTS 637,965   3/1962   Canada.

STANLEY H. TOLLBERG, Primary Examiner